United States Patent [19]

Sauer et al.

[11] 4,009,010
[45] Feb. 22, 1977

[54] METHOD AND APPARATUS FOR FOAM SCRUBBER LEVEL DETECTOR

[75] Inventors: Philip D. Sauer; Thomas F. Payne, both of Flathead, Mont.

[73] Assignee: The Anaconda Company, New York, N.Y.

[22] Filed: Aug. 7, 1975

[21] Appl. No.: 602,679

[52] U.S. Cl. .................................. 55/87; 55/220; 55/270; 55/DIG. 34; 137/170.2
[51] Int. Cl.$^2$ ........................................ B01D 47/04
[58] Field of Search ............. 55/87, 164, 178, 220, 55/270, DIG. 34; 204/195 R; 324/30 B; 73/60.1, 304 R, 304 C, 290 R; 137/5, 170.2; 261/DIG. 26

[56] References Cited
UNITED STATES PATENTS

| | | | |
|---|---|---|---|
| 1,921,725 | 8/1933 | Boutet | 55/87 X |
| 2,379,396 | 6/1945 | Ziliotto | 55/178 X |
| 2,380,436 | 7/1945 | Holdman | 73/290 R |
| 2,626,620 | 1/1953 | Smith | 137/165 |
| 2,926,299 | 2/1960 | Rogoff | 323/68 |
| 3,392,581 | 7/1968 | Miller | 73/304 C |
| 3,461,446 | 8/1969 | Sergeant | 340/244 |
| 3,616,610 | 11/1971 | Javorsky et al. | 55/178 |
| 3,739,795 | 6/1973 | Hyde et al. | 55/178 X |
| 3,835,624 | 9/1974 | Ahlborg | 55/87 X |

*Primary Examiner*—Frank W. Lutter
*Assistant Examiner*—David L. Lacey
*Attorney, Agent, or Firm*—Pennie & Edmonds

[57] ABSTRACT

An apparatus and method particularly adapted for use in preventing accumulation of material on at least a portion of a monitoring device for a foam scrubber or the like. The foam scrubber apparatus comprises a container having a layer of foam material therein, the improvement comprising monitoring means for monitoring said foam material, said monitoring means comprising a first means connected to the container, a second means centrally mounted in said first means, and extending into said foam layer, and fluid supply means in fluid-flow communication with a passage in said first means for supplying a stream of fluid into said first means through said passage and through said first means around said second means to prevent foreign material from accumulating on said second means. The method for preventing accumulation of foreign material on the monitoring means having first and second means which monitoring means monitors a foam layer in a container of a foam scrubber, comprises the steps of supporting the second means in the foam layer by the first means which establishes fluid-flow communication between the outside and inside of the container, and creating at least a partial vacuum in the foam scrubber for drawing a fluid medium through the first means from the outside to the inside of the container and at least along a portion of the second means for preventing accumulation of foreign material along the second means.

9 Claims, 2 Drawing Figures

METHOD AND APPARATUS FOR FOAM SCRUBBER LEVEL DETECTOR

BACKGROUND OF THE INVENTION

1. Field of the Invention

The present invention generally pertains to monitoring devices for indicating certain conditions or properties of a material. More particularly, it pertains to a novel and improved method and apparatus for preventing shorting of monitoring electrodes adapted for use in foam scrubbing apparatuses of the type which are utilized for separating particles and gaseous contaminants from a gaseous medium.

2. Description of the Prior Art

In the pollution abatement field, several well-known categories of apparatuses are especially adapted for use in separating particles from a flowing fluid stream. One of these known categories, for instance, utilizes a foam material which serves to filter particulate matter and absorb gaseous contaminants from a flowing gas stream. In such a type of apparatus, the gas which contains the particulate matter and dissolved gaseous contaminants flows through a channel which is charged with a layer of foam material positioned between a dirty gas inlet and a clean gas outlet. As the gas is forced to travel through the foam, such foam acts to remove particulate matter as well as dissolved gaseous contaminants. The aforedescribed separating apparatus is of the type generally referred to as a foam scrubber, such as the kind disclosed in U.S. Pat. No. 3,616,610.

Although the foregoing type of scrubber arrangement serves to clean a variety of gases, particularly those issuing from industrial operations, they do not always entirely satisfactorily perform their operations. One reason for such performance is that it is somewhat difficult to maintain an optimum foam layer composition; especially whenever synthetic based foaming agents are utilized. A conventional approach taken to insure proper foam layer density is through the use of a monitoring system for measuring foam layer height. Typically, a generally elongated rod-like electrode sensor is mounted by a plastic holder or the like so as to be inserted into the scrubber chamber for exposure to the foam. It is arranged to sense the height of the foam layer and is connected by conventional electrical means to a foam generator. Whenever the foam layer is too low, for example, the sensor generates a signal to a foam generator for actuating the latter such that more foam is supplied to the layer so as to maintain optimum density.

A particular disadvantage which sometimes occurs in the operation of such a monitoring system is the malfunctioning of the electrodes. Consequently, the monitoring system would be unable to detect the level of foam that is charged within the channel and, accordingly, fail to perform its intended operation in that the foam may not separate a sufficient quantity of particulate and dissolved gaseous contaminants from the dirty gas. Such malfunctioning may often arise by reason of the fact that the electrodes are subject to accumulation thereon of foreign particles. It has been determined that, regardless of whether the accumulated foreign particles are conductive or non-conductive, they become saturated with the foam solution. Such accumulation of saturated material may result in the sensing electrode being electrically shorted by virtue of the material creating an electrical path for current to flow from the electrode to a chamber wall to which such electrode is operatively connected. Consequently, of course, the electrode becomes inoperative and the monitoring system fails to perform its intended function.

Although there are known forms of conventional apparatuses which, in general, serve to protect against buildup of particles or the like on sensor probes, they are, in general, more complicated, expensive, or unsuitable for application in foam scrubber units. For instance, U.S. Pat. No. 2,626,620, describes a system wherein a portion of spray water is passed to sensor probes, which probes are surrounded by screens and sheaths. This particular system would not appear to be capable of protecting an electrode in a foam scrubber by reason of the fact that foam saturated foreign particles would seemingly still be able to accumulate on the sensor and screen. Other known approaches of the prior art to protect electrical sensors normally employ shield devices which partially surround the sensors. However, this particular arrangement would, likewise, appear to be subject to the accumulation of foreign material which might cause shorting of an electrode sensor in a foam scrubber apparatus.

While other known procedures may force air from the outside of a chamber to the inside of the chamber, along a probe, such procedures require a relatively enormous volume of a fluid medium. Consequently, such procedures are relatively expensive to successfully operate. Consequently, heretofore known protection devices for electrical sensors do not appear particularly adapted for use in economically and easily preventing build-up of saturated foreign particles on electrode sensors which are exposed to foam in a foam scrubber apparatus.

SUMMARY OF THE INVENTION

Accordingly, it is an object of the present invention to overcome the aforementioned shortcomings associated with the typical types of sensing electrodes utilized to measure height of foam material in foam scrubber apparatuses and the like by providing a novel and improved method and apparatus for preventing accumulation of foam saturated foreign particles on the electrodes to thereby tend to eliminate the likelihood that such electrodes would short out.

Briefly, in accordance with the present invention, an electrical monitoring device is especially adapted to be exposed to a foam material carried in a container of a foam scrubber for monitoring the conditions of the material. Such monitoring device essentially embodies a container having a layer of foam material therein, and a monitoring means for monitoring the foam material. Such monitoring means basically comprises having a first means connected to the container, a second means centrally mounted in the first means, and extending into the foam layer, and fluid supply means in fluid-flow communication with a passage in the first means for supplying a stream of fluid into the first means through a passage and through the first means around the second means to prevent foreign material from accumulating on the second means.

In a preferred embodiment, the method in accordance with the present invention comprises the steps of supporting an electrode probe in a body of foam material which is enclosed in a chamber of a foam scrubber apparatus and which is to be monitored, such that a stream of fluid from outside the chamber is enabled to be induced, by a partial vacuum, to inside the chamber and along at least a portion of the electrode probe which extends into the foam layer for preventing undesired accumulation of foreign material on the probe.

BRIEF DESCRIPTION OF THE DRAWINGS

The above, as well as other objects, features, and advantages of the present invention will become readily apparent upon a detailed reading of a preferred embodiment thereof when viewed in conjunction with the accompanying drawings, wherein like reference numerals indicate like structure throughout the several views.

DETAILED DESCRIPTION

Figure 1:
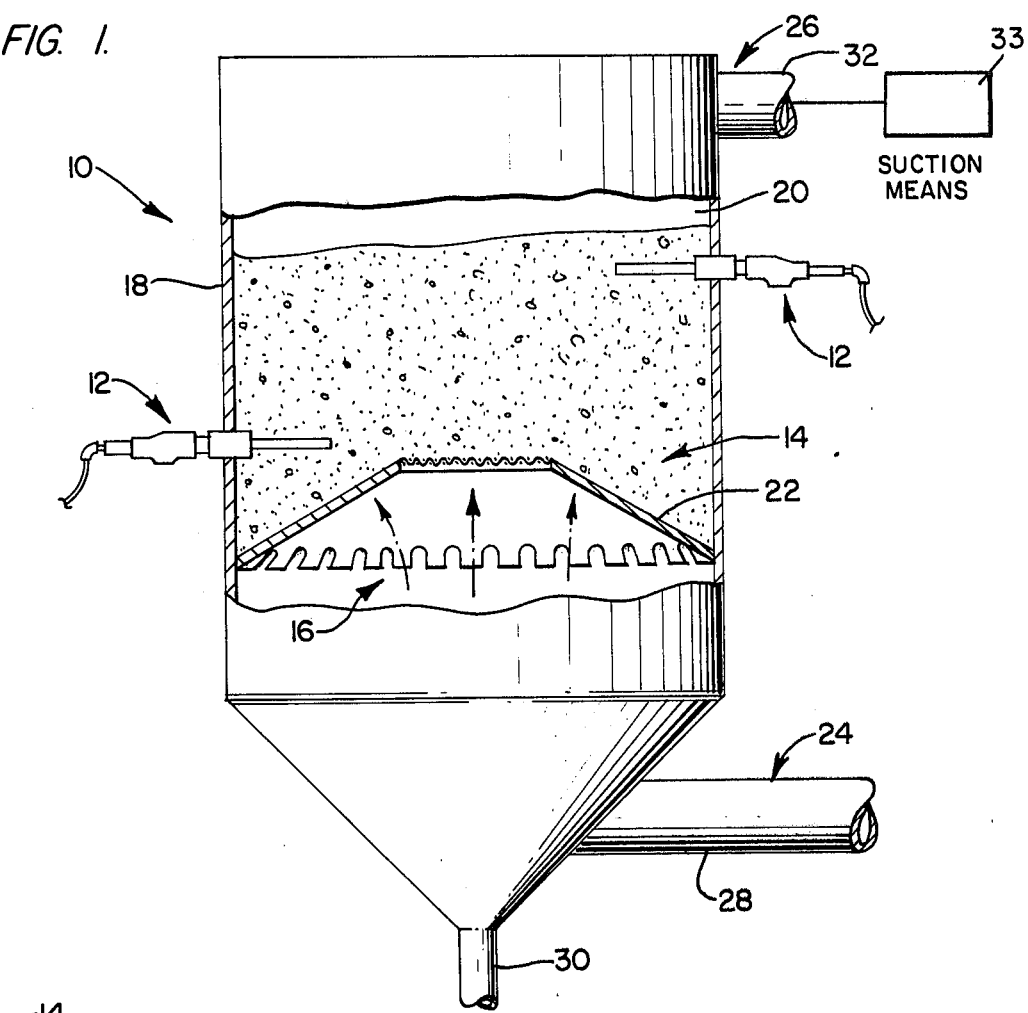
FIG. 1 is a diagrammatic sectional side elevational view of a conventional foam scrubber having associated therewith a novel and improved foam level detector apparatus of the present invention.

Referring specifically to the drawings and, in particular, to FIG. 1, there is depicted a conventional form of foam scrubber apparatus of the type generally described in U.S. Pat. No. 3,616,610 and indicated by reference numeral 10. Scrubber apparatus 10 has operatively associated therewith at least one of the novel and improved foam level detector apparatuses made in accordance with the principles of the present invention and generally designated by reference numeral 12. As viewed in the illustrated embodiment, such level detector apparatus 12 is basically an electrical instrument for purposes of detecting the level of a suitable layer of foam material 14. Usually the layer of foam material 14 is a colloid system which, as previously mentioned, serves to filter particulate matter and absorb gaseous contaminants from a flowing stream of dirty or contaminated gas which is generally designated by reference numeral 16. Typically, the foam material 14 is formed by dispersing air into a well-known kind of liquid foaming agent. It will be understood, of course, that the suitable agents and foam-forming procedures used will be those normally known and conventionally practiced in this particular field.

With continued reference to FIG. 1, the foam scrubber apparatus 10 is depicted as including a generally cylindrical chamber wall 18 defining a chamber 20 within which is housed the layer of foam material 14 on a well-known perforated screen arrangement 22. Air inlet and outlet means 24 and 26, respectively, are appropriately formed at opposite ends of chamber 20. The air inlet means 24 is generally situated beneath screen arrangement 22 and includes a supply pipe 28 which supplies dirty gaseous medium from, for example, an ordinary industrial source (not shown) to the lower portion of chamber 20. An outlet 30 is connected to the lower portion of chamber 20 and may lead to a discharge effluent tank (not shown). Outlet 30 enables waste water and spent foam sludge, which flows downwardly along the chamber walls, to pass through to the effluent tank.

Air outlet means 26 includes an outlet duct 32 which is positioned above foam layer 14 and basically serves to enable the passage of air which has been cleaned as it travelled through the foam layer. It is envisioned for purposes of this invention that outlet duct 32 be operatively connected to a suitable fan or other similar device 33 which serves to draw the dirty air stream 16 upwardly through from air inlet supply pipe 28 through foam layer 14 and finally through air outlet duct 32. The particular significance of this arrangement will become evident in the succeeding description of the present embodiment.

Figure 2:
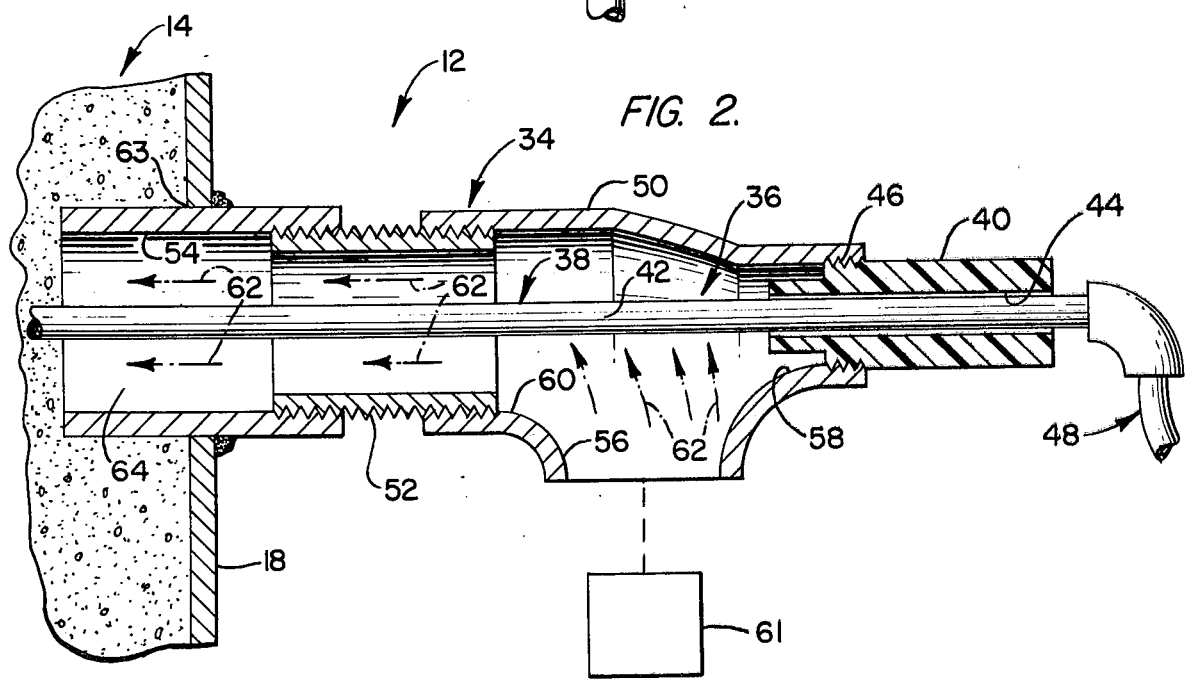
FIG. 2 is a sectional view showing greater detail of the novel and improved foam level detector apparatus embodying the principles of the present invention.

Now referring particularly to FIG. 2, there is perhaps more precisely shown the novel and improved level detector or monitoring means 12 of the present invention. As illustrated, it essentially comprises first or fluid connection means 34, and second or electrode means 36.

The electrode means 36 basically includes a conventional form of sensor means 38 and an electrode holder device 40 for supporting sensor 38. In this particular embodiment, sensor means 38 is defined by any well-known type of generally elongated insulated electrode sensor rod member 42 which has its free end terminating several inches in chamber 20 for exposure to foam layer 14. Electrode holder device 40 is formed of, preferably, a plastic insulating, cylindrical member having an axial bore 44 extending through the longitudinal extent thereof. A threaded section 46 is suitably formed on the forward section of holder 40 for connection to the fluid connection means 36. Of course, the present invention envisions that other suitable forms of insulating materials may be employed for construction of holder device 40. Sensor rod 42 has its opposite end adapted to be suitably received within bore 44 for connection to electrical lead-wires 48 which extend to a conventional form of electrical means for operating an appropriate foam generator device (not shown) in a well-known fashion. The bore 44 is typically dimensioned so as to not permit any appreciable amount of air to pass therethrough for purposes subsequently made evident. By virtue of the foregoing arrangement, sensor means 38 selectively monitors the foam height of foam layer 14 and should, for instance, the height of foam layer 14 fall below a predetermined height, serve to enable actuation of a foam generator to supply foam to the layer. Accordingly, the foam will be at a suitable height for ensuring optimum separation of particulate matter and gaseous contaminants from the contaminated air stream 16.

Fluid connection means 34 of the present embodiment may be comprised of a standard fluidic coupling tee 50, coupling member 52, and connection member 54. Fluid coupling tee 50 may be of any well-known conventional type having an air inlet orifice 56 and two oppositely spaced and internally threaded opening sections 58 and 60, respectively. Air inlet orifice 56 may be suitably and conveniently connected in fluid-flow communication with fluid supply means 61. Such fluid supply means 61 may supply an appropriate source of clean, dry air or dry air with non-conductive material for enabling a stream 62 of such insulating air to enter coupling tee 50. To insure that the air stream 62 properly penetrates the foam layer 14 a sufficient distance along the sensor rod 42 and to prevent foam from entering fluid connection means 34, it should be understood, of course, that the invention contemplates that the air stream be discharged at a suitable rate to achieve this result. Opening section 58 threadedly cooperates with threaded section 46 of holder device 40. In such a manner with the foregoing structural relationship, the sensor rod 42 is generally centrally supported within fluid connection means 34 and air flow from opening 58 is virtually blocked. Opening section 60 threadedly cooperates with one end of coupling member 52 which, in the illustrated embodiment, is generally tubular and externally threaded. The coupling member 52 has its opposite end threadedly cooperating with connection member 54, such as in the manner indicated in FIG. 2. Connection member 54 in the embodiment being illustrated, takes the form of a generally elongated tubular member that extends into foam layer 14 and may be brazed, welded, or otherwise suitably affixed to an opening 63 in chamber wall 18. It is contemplated that the fluid connection means 34 may be fabricated from any suitable material.

Although the preceding description of fluid connection means 34 disclosed several discrete members interconnected together, it should be understood, of course, that this invention also envisions having a fluid connection means 34 made of a single integral member which will act to centrally support the electrode holder device 40 and electrode sensor rod 42 to the chamber wall 18. The fluid connection means 34, as aforedescribed, is constructed to provide for an annular passage 64 about sensor rod 42. Such passage 64 has an exit which terminates in the foam layer 14 such that it enables the passage therethrough of the stream 62 of insulating air for purposes presently described.

As indicated, the present invention contemplates that an insulating stream 62 of clean, dry air, or dry air with nonconductive pollutants pass at a suitable velocity and volume at least along a longitudinal portion of the electrode sensor means 38 and sufficiently penetrate the foam layer 14. In having the insulated stream of clean air 62 advance along a portion of the sensor rod 42, the tendency for foam saturated foreign matter building up on the sensor rod to the point that an electrically conductive path might be formed between it and the chamber wall 18 is significantly diminished or even eliminated. Moreover, the likelihood that fluid connection 34 would be blocked by foam is also avoided. Owing to the conventional fan in the outlet duct 32, a partial vacuum is created in chamber 20, such that the dirty air 16 will, as earlier indicated, be drawn upwardly through the foam layer 14. Since passage 64 communicates with the chamber 20, the partial vacuum will serve to draw such stream of insulating air 62 from fluid supply means 61 through air inlet orifice 56, through annular passage 64, along several inches of the sensor rod 42, and then into the foam layer 14. By utilizing the partial vacuum present in chamber 20, the present invention substantially reduces the amount of air which would have to be used by other techniques, such as blowing air along an electrode sensor rod or the like.

As indicated earlier, proper penetration of the air stream 62 in foam layer 14 is highly desirable. Toward this particular end, the insulating air stream 62 should be discharged into the foam layer at a suitable discharge rate so as to insure that at least several inches of the foam layer is penetrated to thereby prevent foam from entering passage 64, as well as maintain a substantial portion of the electrode sensor means 38 free from accumulation. By way of illustration, and not limitation, it has been determined that if the partial vacuum is sufficient such that the velocity rate is between 530 to 570 ft/min of air through fluid passage 64, measured with a standard thermal anenometer, that the desired penetration of several inches was quite easily attainable for a rather standard foam scrubber, such as of the kind described in U.S. Pat. No. 3,616,610. It should be emphasized though that this particular range could, of course, vary dependent upon the actual operating and structural features of a particular foam scrubber apparatus.

From the foregoing description, it is believed that the operation of the improved level detector apparatus or monitoring means 12 of the instant embodiment is evident. However, to supplement the foregoing description, it will be appreciated that the electrode sensor means 38 is arranged to extend into foam layer for measuring the height of foam layer 14. In a preferred embodiment, a partial vacuum is created in the chamber 20. Since the fluid connection means 34 centrally supports the electrode holder means 38 and defines a passage 64 which establishes fluid communication between the inlet orifice 56 of the fluid connection means and the foam layer 14, the insulated air stream 62 may pass along at least a portion of the sensor rod 42 as it travels from fluid supply means 61, outside the chamber 20, to inside the chamber. As aforementioned, this flow of clean insulated air is discharged at a flow rate which is sufficient to prevent foreign material from accumulating on sensor means 38, especially adjacent the chamber wall 18 and from blocking passage 64. As a consequence, the likelihood of shorting of electrode sensor 38 is significantly diminished.

As can be appreciated from the foregoing, the arrangement of this invention prevents in an uncomplicated, inexpensive, and reliable manner, the shorting of a conventional type of foam level detector apparatus by precluding accumulation of foam saturated foreign materials thereon. It should be understood, of course, that the principles of the present invention permit it to be used to protect other types of electrode sensors.

While the invention has been described in connection with the foregoing embodiment, it is not intended to limit the invention to the particular form set forth above, but, on the contrary, it is intended to cover such alternatives, modifications, and equivalents as may be included within the spirit and scope of the invention as defined in the appended claims.

What is claimed is:

1. In a foam scrubbing apparatus comprising a container having inlet and outlet means with a layer of foam material therebetween and means connected with the outlet means for creating at least a partial vacuum in the container, the improvement comprising monitoring means for monitoring said foam material and for enabling the prevention of the accumulation of foreign material thereon, said monitoring means comprising a first means connected to the container, and electrode means centrally mounted in said first means and extending into said foam layer for monitoring the foam layer; fluid supply means in fluid-flow communication with a passage in said first means for supplying a stream of insulating fluid into said first means through said passage and through said first means around said electrode means in response to the partial vacuum in said container to prevent foreign material from accumulating on said electrode means.

2. In a foam scrubbing apparatus comprising a chamber having inlet and outlet means with a layer of foam material therebetween and means connected with the outlet means for creating at least a partial vacuum in the chamber, the improvement comprising electrode means including a generally elongated electrode sensor exposed to the layer of foam and an electrode holder for supporting said electrode sensor; a fluid connection means centrally supporting said electrode means and for removably securing said holder and said sensor to said chamber, said connection means having a passage surrounding said electrode sensor along at least a portion of said electrode sensor; and fluid supply means in fluid-flow communication with said fluid connection means for supplying a fluid stream of insulating air to said connection means such that the insulating air flows through said passage and past said electrode sensor in response to the partial vacuum being present in the chamber to thereby prevent material from accumulating on at least a portion of said electrode sensor in said chamber and from having the foam material block said passage.

3. In a foam scrubber apparatus comprising a chamber having inlet and outlet means with a layer of foam material therebetween and means connected with the outlet means for creating at least a partial vacuum in the chamber, the improvement comprising an electrode means including a generally elongated electrode sensor adapted to be exposed to the foam layer and an electrode holder for supporting said electrode sensor; a fluid connection means for removably securing and supporting said holder to the chamber such that said holder is spaced from the chamber and said sensor is centrally supported in the fluid connection means and extends into the foam material, said fluid connection means defines a generally annular passageway along a portion of the length of said electrode sensor which terminates into the foam material, and an inlet orifice, which communicates with said passage; and fluid supply means which is connected to said inlet orifice and in fluid-flow communication with said passageway for providing a source of clean insulating air which passes through said connection means and along at least a portion of said electrode holder which extends into the foam layer in response to the partial vacuum being present in the chamber to thereby prevent foreign material from accumulating on at least a portion of said electrode sensor thereby inhibiting shorting of said electrode sensor.

4. An apparatus as set forth in claim 3 in which said means for creating at least a partial vacuum in the chamber provides a suction such as to cause the insulating air to enter the foam layer at a velocity between about 530 and 570 ft/min.

5. A method for use in preventing the accumulation of foam saturated foreign material on an electrode sensor of a monitoring means which monitors the height of a foam layer between inlet and outlet means in a chamber of a foam scrubber apparatus wherein contaminated air is drawn through the foam layer by a partial vacuum comprising the steps of: centrally supporting the electrode sensor in a passageway formed in a means wherein the passageway establishes communication between the outside and inside of the chamber, and directly connecting a fluid supply means which supplies a source of clean, dry, insulating air to the passageway such that the partial vacuum in the chamber draws a stream of the insulating air through the passageway and along a portion of the electrode sensor which extends into the foam layer for preventing accumulation of foam saturated foreign material on at least the portion of the sensor.

6. The method as set forth in claim 5 in which said clean, dry insulating air contains non-conductive pollutants.

7. The method as set forth in claim 6 in which the clean air is drawn into the foam layer at about between 530 to 570 ft/min.

8. The method as set forth in claim 5 in which the clean air is drawn into the foam layer at about between 530 to 570 ft/min.

9. A method for preventing accumulation of foreign material on a monitoring means having first means and electrode means which monitoring means monitors a foam layer between inlet and outlet means in a container of a foam scrubber having means connected with the outlet means for creating at least a partial vacuum, comprises the steps of supporting the electrode mans in the foam layer by the first means which establishes fluid-flow communication between the outside and inside of the container, and creating at least a partial vacuum in the foam scrubber for drawing an insulating fluid medium through the first means from the outside to the inside of the container and at least along a portion of the electrode means for preventing accumulation of foreign material along the second means.

* * * * *